Patent 3,296,037

3,296,037
RUST PREVENTION IN AQUEOUS AMMONIA CONTAINERS
Ernst J. Solberg, South Charleston, and Charles A. Albert, St. Albans, W. Va., assignors to FMC Corporation, New York, N.Y., a corporation of Delaware
No Drawing. Filed July 30, 1963, Ser. No. 298,592
5 Claims. (Cl. 148—6.14)

The present process relates to a method for preventing rust formation on the walls of aqueous ammonia containers, and more particularly, the prevention of rust in tank cars used to transport aqueous ammonia.

Aqueous ammonia solutions are conventionally shipped and stored in containers made of conventional steel, e.g. steel conforming to ASTM A7–58T rather than stainless steel or other non-rusting ferrous alloys. This is permissible because aqueous ammonia solutions normally do not rust such steel containers. While the exact reason for this resistance to corrosion is not known, it is believed that the aqueous ammonia solution, because of its alkalinity, sets up a corrosion-resistant barrier which pacifies the surface of the iron metal and prevents corrosion.

However, if this corrosion-resistant pacifying system is penetrated and corrosion commences, the corrosion-resistant system breaks down completely and rusting takes place at a rapid rate over the entire interior surface of the container in contact with the aqueous ammonia solution. Once this rusting occurs, the tank car or container is thereafter subject to continual corrosion. Such corrosion is most serious since it eats into the container wall and shortens the useful life of the container. Most importantly, the rust particles which are produced from the corrosion reaction flake off and contaminate the aqueous ammonia solution. Rust is objectionable since only a small amount is sufficient to foul the entire aqueous ammonia solution and result in a characteristic "orange juice" coloration.

Various methods have been attempted in order to prevent continual rusting of steel containers used to transport and store aqueous ammonia solutions. One such method calls for the application of concentrated sodium hydroxide solutions to the inner surface of the tank cars followed by a thorough cleaning and a water wash. While these systems remove loose rust particles from the containers, they have not been found effective in halting additional rusting when aqueous ammonia solutions are loaded into the containers.

It is an object of the present invention to prevent the rusting of steel containers such as tank cars which are rusted by aqueous ammonia solutions in a simple operation without the use of special equipment or chemical treating solutions.

We have now found, quite unexpectedly, that steel containers which are subject to rust by aqueous ammonia solutions can be treated to prevent rusting by initially cleaning the steel to remove residual rust, grease and other contaminants from the surface of the steel container, contacting the surface of the steel container with an aqueous ammonia solution until the entire inner surface of the container is covered with a continuous, corrosion-produced film, removing the aqueous ammonia solution from contact with the container, drying the corrosion-produced film, and maintaining the film in a dry state for at least about 5 hours (preferably 24 hours).

The manner in which the uniform corrosion-produced film acts to prevent additional rusting of steel surfaces in contact with aqueous ammonia is unknown. However, it has been established that the corrosion-produced film that builds up over the inner surface of the container initially must be in contact with aqueous ammonia, and that subsequently this film must be dried, and allowed to remain dry in excess of about 5 hours in order for the resultant film to be an effective corrosion-resistant barrier. The use of plain water to produce a film of rust followed by drying, does not produce a corrosion-resistant film.

In carrying out the present invention with an aqueous ammonia container such as a tank car, the following procedure is employed. The interior of the tank car is scraped of all loose rust and other accumulations in the tank car. The interior of the tank car is then cleaned to remove all grease, oil and other contaminants which adhere to the surface of the metal. This can be done by sanding the interior surface of the car or by using other cleaning techniques such as sand blasting, etc. After all foreign impurities have been removed from the interior surface of the car, the inner steel surface is placed in contact with aqueous ammonia solution. The concentration of the ammonia solution employed is not critical and can be at any concentration above about 0.5% by wt. ammonia. However, a convenient concentration of aqueous ammonia which is generally employed is about 30%. The inner steel surface may be wetted by the aqueous ammonia in any convenient manner. The preferred method is to simply fill up the tank car with the aqueous ammonia solution. However, it is possible to continually spray aqueous ammonia into the interior of the tank car so as to maintain a continuous film of aqueous ammonia on the inner surface of the tank car. In such an operation, the ammonia solution which is recovered at the base of the tank car is recycled to the sprayers.

The aqueous ammonia is maintained in contact with the inner surface of the tank car until a continuous, uniform, corrosion-produced film has covered the interior of the tank. Generally, the corrosion-produced film has been found to be dark, almost black in color, and quite thin. In some cases, particularly with dilute aqueous ammonia solutions of from about 0.5 to about 2.5% by wt. ammonia, the corrosion-produced film which is obtained is light colored similar to the color of the sand blasted steel surface. Under normal circumstances, from about 1 to about 15 days is required to build up this continuous, thin, corrosion-produced film. After the desired corrosion-produced film has been deposited, the container is drained of aqueous ammonia solution, the film is dried, and then permitted to remain dry for a period of at least about 5 hours, and preferably 24 hours. The removal and drying of the inner surface of the container can be accelerated by blowing heated air into the container. After the film has been maintained in a dry state for the required time, aqueous ammonia can then be loaded into the container without rusting the interior of the tank.

Typical steels which can be treated by this process are those conforming to ASTM A285–57T grade C flange quality, type A7–58T and those conforming to AISI C1015 and C1020. Most steels which are not specially compounded to prevent rusting such as stainless steel, and which are normally employed in the construction of tank cars and storage tanks can be protected by this invention.

The following examples are given to illustrate the invention and are not deemed to be limitative thereof.

EXAMPLE 1

*Run A.*—A series of coupons, 2 x 2 inches, made of steel conforming to ASTM A7–58T, and which rusted when in contact with aqueous ammonia, were treated to measure corrosion under the conditions described below: The steel coupons were first cleaned by sand blasting and then placed in 30% aqueous ammonia solution for a period of 9 days (pickling procedure). The coupons became coated with a corrosion-produced dark film. They were removed from the aqueous ammonia solution, dried and allowed to remain dry overnight for a period of 16 hours. After drying, the coupons were found to have a hard, tenacious black film, uniformly distributed over all surfaces. They were then placed in fresh aqueous 30% ammonia solution. The coupons remained clear without any further evidence of rusting.

*Run B.*—The above pickling procedure was repeated and the coupons developed the characteristic dark corrosion-produced film as in Run A. The coupons were removed and rinsed with 30% aqueous ammonia but were not permitted to dry. Instead, they were replaced immediately in fresh 30% aqueous ammonia solution. After 16 hours, the aqueous ammonia changed from a clean, water-like solution to a light orange color. Further examination of the coupons indicated that additional rusting was occurring.

EXAMPLE 2

A series of coupons were pickled in the same manner as described in Example 1, Run A. The coupons were removed from the 30% aqueous ammonia solution, dried and permitted to remain dry for varying amounts of time before being placed in fresh 30% aqueous ammonia solution. The results are listed below:

| Coupon | Drying Time | Degree of Rusting |
| --- | --- | --- |
| 1 | 0 (barely dry) | Appreciable rusting in 16 hours. |
| 2 | 3 hours | Rusting visible after 24 hours. |
| 3 | 6 hours | No rusting. |
| 4 | 7 hours | Do. |
| 5 | 16 hours (overnight treatment). | Do. |

A control coupon was employed in the above runs by allowing it to remain in a 30% aqueous ammonia solution throughout the entire testing period. This showed heavy rusting.

EXAMPLE 3

A series of coupons made of steel conforming to the type used in Example 1, Run A were placed in 30% aqueous ammonia for a period of 1, 2, 3, 4 and 12 days, respectively. After pickling for the prescribed period of time, each was rinsed in 30% aqueous ammonia solution, dried overnight for 16 hours and placed in clean 30% aqueous ammonia. None of the coupons showed evidence of rusting in the 30% aqueous ammonia.

EXAMPLE 4

A series of coupons were pickled in the manner described in Example 1, Run A. They were then removed from the 30% aqueous ammonia solution and placed in an oven at 150° F. to dry. The coupons were left in the oven overnight at this temperature for 16 hours. They were then removed from the oven and placed in fresh 30% aqueous ammonia solution where they remained without showing any evidence of rusting.

EXAMPLE 5

A series of coupons were pickled in the manner described in Example 1, Run A in aqueous ammonia solutions having weight percents of 30%, 10%, 5%, 2.5%, 1% and 0.5%. The coupons in the 30%, 10% and 5% solutions became covered with a uniform, dark, corrosion-produced film; the film on the coupons in the 2.5%, 1% and 0.5% solutions was light colored. The coupons were removed from their solutions, dried for 16 hours, and all were placed in fresh 30% aqueous ammonia. All the coupons remained clear without any evidence of rusting.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. The process of treating a steel surface which rusts when in contact with aqueous ammonia which comprises removing residual rust and contaminants from said steel surface, contacting said steel surface with an aqueous ammonia solution having a concentration above about 0.5 wt. percent to build up a thin, continuous, corrosion-produced film on said steel surface, removing said aqueous ammonia solution from contact with said corrosion-produced film, drying said corrosion-produced film, and maintaining said corrosion-produced film in a dry state for at least about 5 hours, said corrosion-produced film preventing corrosion of said steel surface when in contact with aqueous ammonia.

2. The process of treating a steel surface which rusts when in contact with aqueous ammonia which comprises removing residual rust and contaminants from said steel surface, contacting said steel surface with an aqueous ammonia solution having a concentration from about 0.5 to about 30 wt. percent to build up a thin, continuous, corrosion-produced film on said steel surface, removing said aqueous ammonia solution from contact with said corrosion-produced film, drying said corrosion-produced film, and maintaining said corrosion-produced film in a dry state for at least about 5 hours, said corrosion-produced film preventing corrosion of said steel surface when in contact with aqueous ammonia solutions.

3. Process of claim 2 in which said corrosion-produced film is maintained in a dry state for a period of about 16 hours.

4. Process of claim 2 in which said steel surface conforms to ASTM A7–58T.

5. Process of claim 2 wherein said aqueous ammonia solution has a concentration of from about 5 to about 30 wt. percent.

References Cited by the Examiner

UNITED STATES PATENTS

| 2,366,796 | 1/1945 | Lawrence. | |
| 2,653,882 | 9/1953 | Treseder | 148—6.14 X |
| 3,011,862 | 12/1961 | Watkins | 148—6.14 X |
| 3,078,993 | 2/1963 | Sheldahl et al. | 148—6.14 X |
| 3,162,550 | 12/1964 | Dvoracek et al. | 148—6.14 |

ALFRED L. LEAVITT, *Primary Examiner.*

K. S. KENDALL, *Assistant Examiner.*